(12) United States Patent
McLean (10) Patent No.: US 10,594,713 B2
(45) Date of Patent: Mar. 17, 2020

(54) SYSTEMS AND METHODS FOR SECURE PROPAGATION OF STATISTICAL MODELS WITHIN THREAT INTELLIGENCE COMMUNITIES

(71) Applicant: SECUREWORKS CORP., Wilmington, DE (US)

(72) Inventor: Lewis McLean, Edinburgh (GB)

(73) Assignee: SECUREWORKS CORP., Wilmington, DE (US)

(*) Notice: Subject to any disclaimer, the term of this patent is extended or adjusted under 35 U.S.C. 154(b) by 123 days.

(21) Appl. No.: 15/809,273

(22) Filed: Nov. 10, 2017

(65) Prior Publication Data

US 2019/0149564 A1    May 16, 2019

(51) Int. Cl.
*G06F 12/14*    (2006.01)
*H04L 29/06*    (2006.01)
*G06F 11/30*    (2006.01)

(52) U.S. Cl.
CPC ...... *H04L 63/1425* (2013.01); *H04L 63/1416* (2013.01); *H04L 63/1433* (2013.01); *H04L 63/0442* (2013.01); *H04L 63/061* (2013.01)

(58) Field of Classification Search
CPC ............... H04L 63/1425; H04L 63/061; H04L 63/0442

(Continued)

(56) References Cited

U.S. PATENT DOCUMENTS 5,937,066 A * 8/1999 Gennaro ............... H04L 9/0841
                                                    380/286
6,357,010 B1    3/2002 Viets et al.

(Continued)

FOREIGN PATENT DOCUMENTS

WO    WO2007002749 A2    1/2007
WO    WO2007090605 A1    8/2007
WO    WO2010059843 A2    5/2010

OTHER PUBLICATIONS

Buyukkayhan, Ahmet Bali; Oprea, Alina; Li, Zhou; and Robertson, William; "*Lens on the endpoint; Hunting for malicious software through endpoint data analysis*"; International Symposium on Research in Attacks, Intrusions, and Defenses; RAID 2017: Research in Attacks, Intrusions, and Defenses Proceedings; pp. 73-79; Sep. 18-20, 2017; Atlanta, GA, USA.

(Continued)

*Primary Examiner* — Aravind K Moorthy
(74) *Attorney, Agent, or Firm* — Womble Bond Dickinson (US) LLP (57) ABSTRACT

Systems/method of securely propagating analytical models for detection of security threats and/or malicious actions among a threat intelligence community can be provided. Attributes of security data accessed members of the threat intelligence community can be determined and encoded. Analytical model(s) can be developed for detection of potential malicious actions using the encoded attributes of the security data and a derivation data schema, and this derivation data schema can be encrypted. The model(s) can be translated into common exchange formats for sharing the model with community members. The encrypted derivation data schema can be transmitted to the community members. After receipt, the derivation data schema can be decoded by the community members, and the derivation data schema can be applied to security data to determine if the encoded attributes are found. If the encoded attributes are derived, remedial or mitigating action can be taken.

14 Claims, 5 Drawing Sheets

(58) Field of Classification Search
USPC .................. 713/171, 165, 188; 726/23, 25
See application file for complete search history.

(56) References Cited

U.S. PATENT DOCUMENTS

| | | |
|---|---|---|
| 7,269,578 B2 | 9/2007 | Sweeney |
| 7,331,061 B1 | 2/2008 | Ramsey et al. |
| 7,548,932 B2 | 6/2009 | Horvitz et al. |
| 7,555,482 B2 | 6/2009 | Korkus |
| 7,571,474 B2 | 8/2009 | Ross et al. |
| 7,594,270 B2 | 9/2009 | Church et al. |
| 7,606,801 B2 | 10/2009 | Faitelson et al. |
| 7,613,722 B2 | 11/2009 | Horvitz et al. |
| 7,770,031 B2 | 8/2010 | MacKay et al. |
| 7,856,411 B2 | 12/2010 | Darr |
| 8,079,081 B1 | 12/2011 | Lavrik et al. |
| 8,122,495 B2 | 2/2012 | Ramsey et al. |
| 8,156,553 B1 | 4/2012 | Church et al. |
| 8,327,419 B1 | 12/2012 | Korablev |
| 8,407,335 B1 | 3/2013 | Church et al. |
| 8,490,193 B2 | 7/2013 | Sarraute et al. |
| 8,490,196 B2 | 7/2013 | Lucangeli et al. |
| 8,522,350 B2 | 8/2013 | Davenport et al. |
| 8,539,575 B2 | 9/2013 | Schmitlin et al. |
| 8,578,393 B1 | 11/2013 | Fisher |
| 8,595,170 B2 | 11/2013 | Gladstone et al. |
| 8,621,618 B1 | 12/2013 | Ramsey et al. |
| 8,701,176 B2 | 4/2014 | Ramsey et al. |
| 8,805,881 B2 | 8/2014 | Hom et al. |
| 8,832,048 B2 | 9/2014 | Lim |
| 8,839,414 B2 | 9/2014 | Mantle et al. |
| 8,909,673 B2 | 12/2014 | Faitelson et al. |
| 8,931,095 B2 | 1/2015 | Ramsey et al. |
| 8,938,802 B2 | 1/2015 | Davenport et al. |
| 8,959,115 B2 | 2/2015 | Marathe |
| 8,984,644 B2 | 3/2015 | Oliphant et al. |
| 9,009,828 B1 | 4/2015 | Ramsey et al. |
| 9,032,478 B2 | 5/2015 | Ballesteros et al. |
| 8,928,476 B2 | 6/2015 | Jerhotova et al. |
| 9,046,886 B2 | 6/2015 | Chong et al. |
| 9,047,336 B2 | 6/2015 | Hom et al. |
| 9,069,599 B2 | 6/2015 | Martinez et al. |
| 9,098,702 B2 | 8/2015 | Rubin et al. |
| 9,129,105 B2 | 9/2015 | Donley et al. |
| 9,137,262 B2 | 9/2015 | Qureshi et al. |
| 9,298,895 B2 | 3/2016 | Lim |
| 9,319,426 B2 | 4/2016 | Webb et al. |
| 9,338,134 B2 | 5/2016 | Yin |
| 9,338,180 B2 | 5/2016 | Ramsey et al. |
| 9,430,534 B2 | 8/2016 | Bhattacharya et al. |
| 9,438,563 B2 | 9/2016 | Yin |
| 9,519,756 B2 | 12/2016 | Bitran et al. |
| 9,544,273 B2 | 1/2017 | Fleury et al. |
| 9,548,994 B2 | 1/2017 | Pearcy |
| 9,560,062 B2 | 1/2017 | Khatri et al. |
| 9,560,068 B2 | 1/2017 | Figlin et al. |
| 9,596,252 B2 | 3/2017 | Coates et al. |
| 9,628,511 B2 | 4/2017 | Ramsey et al. |
| 9,667,656 B2 | 5/2017 | Banerjee et al. |
| 9,667,661 B2 | 5/2017 | Sharma et al. |
| 9,710,672 B2 | 7/2017 | Braun |
| 9,742,559 B2 * | 8/2017 | Christodorescu ..... H04L 9/0819 |
| 9,767,302 B2 | 9/2017 | Lim |
| 9,805,202 B2 | 10/2017 | Medeiros et al. |
| 9,973,524 B2 | 5/2018 | Boyer et al. |
| 10,050,992 B2 | 8/2018 | Thyni et al. |
| 10,116,500 B1 * | 10/2018 | Long ..................... H04L 67/306 |
| 10,382,489 B2 | 8/2019 | Das et al. |
| 10,425,223 B2 | 9/2019 | Roth et al. |
| 10,474,820 B2 | 11/2019 | Manadhata |
| 2002/0129135 A1 | 9/2002 | Delany et al. |
| 2005/0138204 A1 | 6/2005 | Iyer et al. |
| 2005/0288939 A1 | 12/2005 | Peled et al. |
| 2006/0012815 A1 * | 1/2006 | Ebner ................. H04N 1/00127 358/1.13 |
| 2006/0037076 A1 | 2/2006 | Roy |
| 2006/0195575 A1 | 8/2006 | Delany et al. |
| 2006/0253447 A1 | 11/2006 | Judge |
| 2007/0226248 A1 | 9/2007 | Darr |
| 2007/0226807 A1 | 9/2007 | Ginter et al. |
| 2008/0077593 A1 | 3/2008 | Abrams et al. |
| 2008/0219334 A1 | 9/2008 | Brainos et al. |
| 2008/0255997 A1 * | 10/2008 | Bluhm ................. G06Q 10/06 705/80 |
| 2008/0320000 A1 | 12/2008 | Gaddam |
| 2009/0198682 A1 | 8/2009 | Buehler et al. |
| 2010/0083374 A1 | 4/2010 | Schmitlin et al. |
| 2010/0125913 A1 | 5/2010 | Davenport et al. |
| 2011/0004771 A1 * | 1/2011 | Matsushima ......... G06F 21/554 713/189 |
| 2011/0179492 A1 * | 7/2011 | Markopoulou ....... G06F 21/552 726/25 |
| 2011/0276604 A1 | 11/2011 | Hom et al. |
| 2012/0117640 A1 | 5/2012 | Ramsey et al. |
| 2012/0185275 A1 | 7/2012 | Loghmani |
| 2012/0246730 A1 * | 9/2012 | Raad .................. H04L 61/1511 726/25 |
| 2012/0260341 A1 | 10/2012 | Chan et al. |
| 2013/0104191 A1 | 4/2013 | Peled et al. |
| 2013/0173620 A1 | 7/2013 | Takenouchi |
| 2013/0226938 A1 | 8/2013 | Risher et al. |
| 2013/0282746 A1 * | 10/2013 | Balko ................... G06Q 10/06 707/758 |
| 2013/0291103 A1 | 10/2013 | Davenport et al. |
| 2013/0318604 A1 | 11/2013 | Coates et al. |
| 2014/0041028 A1 | 2/2014 | Ramsey et al. |
| 2014/0051432 A1 * | 2/2014 | Gupta .................... G06F 21/57 455/425 |
| 2014/0222712 A1 * | 8/2014 | Samaha ................ G06Q 10/00 705/342 |
| 2014/0373151 A1 | 12/2014 | Webb et al. |
| 2015/0040225 A1 | 2/2015 | Coates et al. |
| 2015/0135287 A1 | 5/2015 | Medeiros et al. |
| 2015/0156212 A1 | 6/2015 | Khatri et al. |
| 2015/0186618 A1 * | 7/2015 | Poorvin ................. G16H 10/20 705/3 |
| 2015/0222652 A1 | 8/2015 | Ramsey et al. |
| 2015/0271047 A1 | 9/2015 | McLean |
| 2015/0324467 A1 | 11/2015 | McLean |
| 2016/0014140 A1 | 1/2016 | Akireddy |
| 2016/0139886 A1 * | 5/2016 | Perdriau .................. G06F 8/22 717/104 |
| 2016/0182546 A1 | 6/2016 | Coates et al. |
| 2016/0241591 A1 | 8/2016 | Ramsey et al. |
| 2016/0313709 A1 * | 10/2016 | Biesdorf ................ G06F 16/27 |
| 2016/0337400 A1 | 11/2016 | Gupta |
| 2016/0342805 A1 | 11/2016 | Lim |
| 2017/0098087 A1 | 4/2017 | Li |
| 2017/0111379 A1 | 4/2017 | Khatri et al. |
| 2017/0140295 A1 | 5/2017 | Bandara |
| 2017/0142149 A1 | 5/2017 | Coates et al. |
| 2017/0169154 A1 | 6/2017 | Lin et al. |
| 2017/0171228 A1 | 6/2017 | McLean |
| 2017/0201381 A1 | 7/2017 | Kinder et al. |
| 2017/0201431 A1 | 7/2017 | Kinder et al. |
| 2017/0201490 A1 | 7/2017 | Kinder et al. |
| 2017/0201548 A1 | 7/2017 | Kinder et al. |
| 2017/0243004 A1 | 8/2017 | Kinder et al. |
| 2017/0243005 A1 | 8/2017 | Kinder et al. |
| 2017/0244734 A1 | 8/2017 | Kinder et al. |
| 2017/0244750 A1 | 8/2017 | Kinder et al. |
| 2017/0244754 A1 | 8/2017 | Kinder et al. |
| 2017/0244762 A1 | 8/2017 | Kinder et al. |
| 2017/0318034 A1 * | 11/2017 | Holland .............. H04L 63/1416 |
| 2018/0089574 A1 * | 3/2018 | Goto ....................... G06N 5/04 |
| 2018/0091306 A1 * | 3/2018 | Antonopoulos ........ G06F 21/57 |
| 2018/0124073 A1 * | 5/2018 | Scherman ........... H04L 63/1425 |
| 2018/0124085 A1 * | 5/2018 | Frayman ............ H04B 10/1149 |
| 2018/0152480 A1 | 5/2018 | Kinder et al. |
| 2018/0181599 A1 | 6/2018 | Crabtree |
| 2018/0367550 A1 * | 12/2018 | Musuvathi .......... H04L 63/1416 |
| 2019/0014149 A1 | 1/2019 | Cleveland et al. |
| 2019/0050554 A1 | 2/2019 | Fiske |

(56) References Cited

U.S. PATENT DOCUMENTS

2019/0095801 A1* 3/2019 Saillet .................. G06N 5/04
2019/0130009 A1 5/2019 McLean
2019/0141079 A1* 5/2019 Vidas .................. H04L 63/20
2019/0342296 A1 11/2019 Anandam et al.

OTHER PUBLICATIONS https://en.wikipedia.org/wiki/Predictive_Model_Language; *Predictive Model Markup Language* (PMML); Jul. 17, 2017 (page last edited).
https://en.wikipedia.org/wiki/XML; *Extensible Markup Language (XML)*; Jul. 6, 2017 (page last edited).
https://en.wikipedia.org/wiki/predictive_modelling; *Predictive modeling*; Jun. 29, 2017 (page last edited).
https://en.wikipedia.org/wiki/Statistical_model; *Statistical model*; Jul. 31, 2017 (page last edited).
https://en.wikipedia.org/wiki/Predictive_analytics; *Predictive analytics*; Jul. 2, 2017 (page last edited).
Data Mining Group; *What is PFA for?*; https://dmg.org/pfa/docs/motivation/; Jan. 19, 2016 (available).
*Secureworks—Log Management—Protect your infrastructure from known and emerging threats*; www.secureworks.com/resources/ds-log~management; 2015 (available).
Sofya Raskhodnikova & Adam Smith; CSE 598A Algorithmic Challenges in Data Privacy; Lecture 2; Jan. 19, 2010.

* cited by examiner

SYSTEMS AND METHODS FOR SECURE PROPAGATION OF STATISTICAL MODELS WITHIN THREAT INTELLIGENCE COMMUNITIES

BACKGROUND

In general, managed network or system security programs or platforms are designed to try to detect threats from malicious actors and take actions to address or remediate such threats. However, the volume and frequency of malicious actions or threats is increasing, and new and/or more covert or difficult to detect threats also are being developed at an alarming rate. The actions taken by attackers/malicious actors many times only become recognizable as part of a threat or become apparent in hindsight, and thus often are noticeable/detectible sometime only after security has been initially compromised, and/or with threat/malicious actions frequently changing or modifying their tactics, making it difficult to quickly identify, detect and/or stop malicious actors/attackers from inflicting serious harm.

To try to combat such malicious actors, threat intelligence communities have developed, in which security application developers, vendors and users can share indicators of compromises (IOCs) such as IP addresses, URL's, vulnerabilities, malicious software hashes, analytics, and other information known to be used by or indicative or a potential threats or malicious actors. However, such communities are established on a trust basis and generally rely upon authentication using common methods. As a result, if a threat or malicious actor gains access to the community and/or the information and analytics being exchanged between the members thereof, they can gain a significant tactical advantage by knowing what features or other identifying information is being used and how such information is analyzed by security programs or providers and/or personnel among the community to detect their attacks, and can change their tactics accordingly to help them evade detection.

It therefore can be seen that a need exists for a system and method for data owners to be able to share security data and analytics in a manner to enable the rapid development of new or updated security applications or models for detecting or deterring malicious actors. The present disclosure addresses these and other related and unrelated problems in the art.

SUMMARY

Briefly described, the present disclosure is, in one aspect, directed to a security platform or system that enables data controllers or owners, managed security service providers (MSSPs), security analysts, security researchers, security application developers, security incident responders, and/or other entities of a threat intelligence community to share analytical, e.g., statistical or probabilistic, models for accessing and/or detecting possible threats with enhanced security. The threat intelligence community members thus can leverage or utilize the network effect of different members running or applying such shared models on similar data. The format of the analytical model and/or selected expressions or components thereof can be easily shared using an open language format or series of open formats (e.g., PMML, etc.) so as to enable sharing of the model across a variety of software and hardware platforms, while enabling community members to generate and provide secure updates to the derivation or function component(s) of the model to other members of the community without necessarily having to recreate or substantively change the model(s) or the format thereof, as well as make upgrades or modifications of existing analytical models and identified encoded security attributes indicative of malicious or threat activities to enable potential prediction and detection of such malicious activity or attacks, with enhanced efficiency and to substantially reduce response times for addressing such attacks or threats.

The analytic model (or plurality or set of models) created generally can include the application of a fixed input component (i.e., raw security data) and a derivation data schema (DDS) component that is applied to the raw security data to derive/determine the existence of data attributes that are known or are recognized, either alone or in combination with other derived/identified attributes, to indicate or predict the existence of malicious or risk actions or threats to a desired or predetermined level of certainty/probability. The derivation data schema component (and updates thereto) can, for example, utilize or otherwise incorporate machine learning, statistical analysis, name entity recognition or other probabilistic modeling. The derivation data schema component further can be encrypted for transmission to the threat intelligence community members. Thus, regardless of a threat actor gaining access to or knowledge of the model itself and/or the raw security data being analyzed/processed by the model, the derivation data schema to be used by the model (and updates thereto) to derive the attributes used by the threat intelligence community members to predict a malicious act and/or remediate such acts, can be encrypted and securely transmitted. This enables easy and secure sharing of such predictive or analytic models for leveraging the network effect between a plurality of participants, e.g., data developers/owners, using or otherwise accessing such models, thus benefitting from the actions taken/analysis of similar or shared data by a number of shared data owners analyzing and/or applying the security modules/applications to such data in parallel, and/or easily share new or updated security applications or models developed thereby across a variety of different hardware and/or software platforms.

In another aspect, the present disclosure can provide a method or process for providing secure propagation or sharing of statistical models. For example, the method/process may include accessing incoming and/or historical raw security data, for example, data ingested, aggregated, or collected from monitoring or otherwise observing one or more networked systems. In addition, or in the alternative, accessed security data can be developed, exchanged and/or shared between participants in one or more threat communities, MSSPs and their clients, security analysts, security researchers, security application developers, security incident responders, partners or like actors, and/or other suitable entities, or combinations thereof. Selected attributes of the raw security data, including one or more measurements that are designed to identify or mitigate known attacks or recognized or identified abnormalities, can then be identified, selected and/or encoded to develop a derivation data schema (DDS) that can be used as a component in a predictive model which can be selected, generated, derived, or otherwise accessed for processing of the raw security data to analyze encoded or selected attributes thereof to predict or identify and/or respond to perceived/detected security threats. The predictive model further can be presented or translated into common exchange formats or other formats (e.g., PMML, etc.) to enable the predictive model to be read or otherwise understood by multiple users or members of one or more threat intelligence communities including users with a variety of differing hardware and/or software systems.

In addition, the analytic or predictive model can be sent out to, or otherwise received by, select entities of one or more threat intelligence communities. The derivation data schema (DDS) component further can be encrypted and sent out to or otherwise received by one or more trusted or verified members of the threat intelligence communities. In addition, an encryption key, or other suitable feature for decrypting the encrypted derivation data schema (DDS), also can be provided to the trusted or verified threat intelligence community member(s). The threat intelligence community member(s) can decrypt the derivation data schema (DDS) and apply the predictive model (or other selected predictive models) to the raw security data using the derivation data schema (DDS) or updated/modified versions thereof. The threat intelligence community member(s) can update or modify the predictive model and/or derivation data schema (DDS) as needed, e.g., to meet their specific requirements and/or as a new attack(s) is detected. The models/derivation data schema (DDS) (and updates thereto) and other/new models or derivation data schema(s) (DDS) can be shared directly between trusted members of the threat community using suitable network communications, e.g., email, file transfer systems, etc., without the requirement of a third-party intermediary.

Various objects, features and advantages of the present disclosure will become apparent to those skilled in the art upon a review of the following detailed description, when taken in conjunction with the accompanying drawings.

BRIEF DESCRIPTION OF THE FIGURES

It will be appreciated that for simplicity and clarity of illustration, elements illustrated in the figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings. As shown in FIGS. 1-5, the present disclosure can provide a system and/or a product or program, e.g., a computer program product or plurality of computer program products, for secure propagation and/or sharing of statistical models for threat monitoring/detection.

Figure 1:
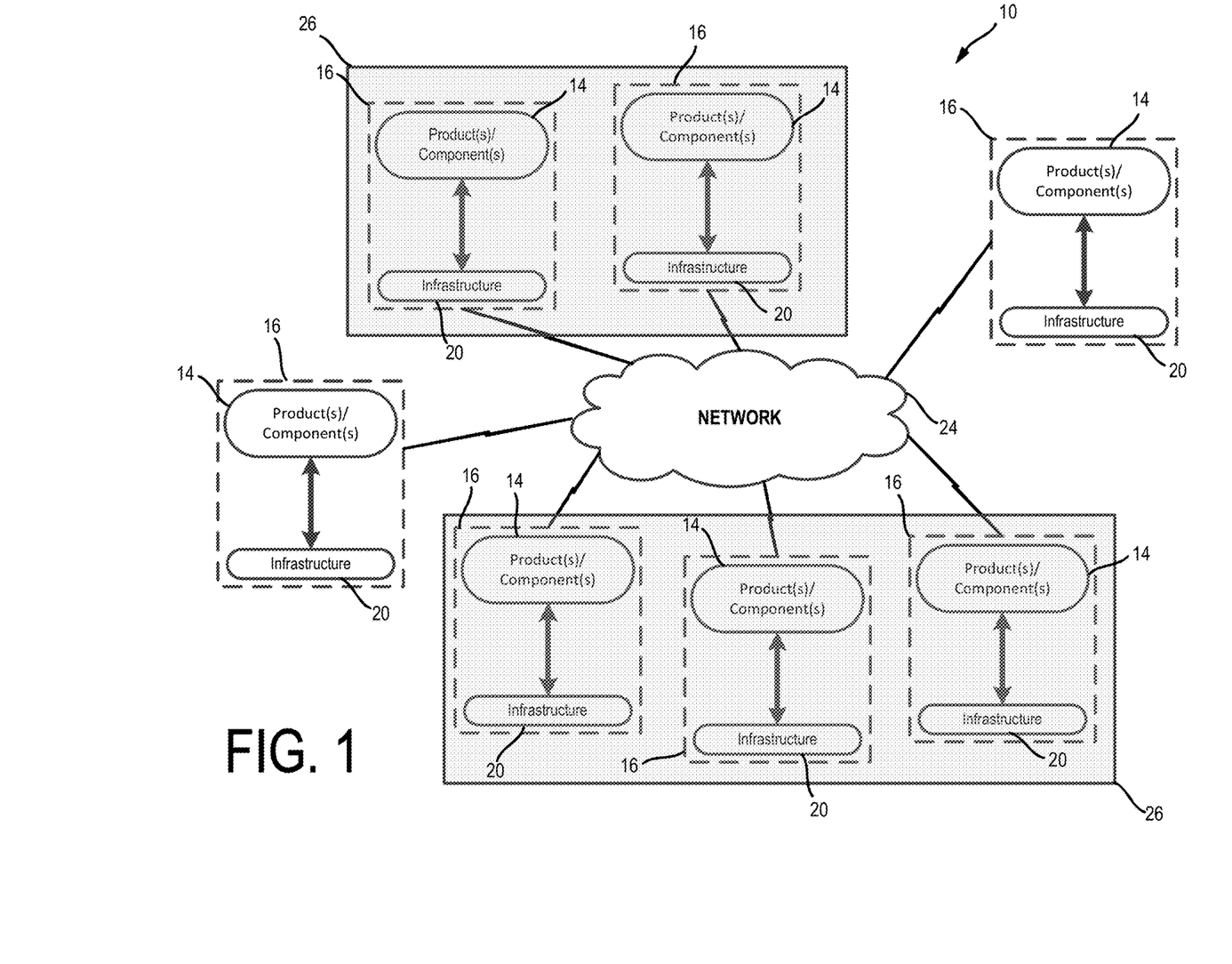
FIG. 1 is a schematic diagram of a system for providing secure propagation or sharing of statistical models according to one aspect of the present disclosure.

FIG. 1 shows a schematic diagram of a security system 10 for secure propagation and/or sharing of statistical, predictive or other security analytic models 12. The system 10 can include a program or product 14 (or plurality or set of programs/products) that can be accessed by a plurality of participants 16. For example, as shown in FIG. 1, the program(s) or components thereof 14 can be saved, uploaded, downloaded or otherwise resident on infrastructure 20, e.g., a networked system 22 of information handling devices (FIG. 2), managed or otherwise controlled and/or accessed by the participants. The participants 16 also can manage, operate, or otherwise access various other types of public, private, or on premise infrastructure. For example, the participants also can access infrastructure that can be operated by a separate or other third party, e.g., an infrastructure provider or technology partner, on behalf of the participant and participants further may use or access a cloud computing platform or other suitable web service, such as Amazon Web Services® and/or one or more third-party data managers, such as Splunk® or Cloudera®, and the program(s)/product(s) and/or components thereof may be operable to integrate or otherwise communicate with these program services/platforms. The program(s) or components thereof do not have to be resident on the infrastructure 20 and/or network/systems 22 managed/accessed by the participants, however, and the program/product may be cloud based or otherwise accessed remotely via a network, such as the Internet (e.g., the product 14 can be accessed through a website, web portal, etc.) or other suitable connection or communication lines, without departing from the present disclosure. As further shown in FIG. 1, the participants can communicate and share information via a network 24, which may include the Internet or another wide area network, a local area network, other private or public network(s), e.g., a virtual personal network, peer to peer file sharing system and/or other external or internal network, or suitable communication lines, or combination thereof. The program(s)/product(s) or components thereof may manage or facilitate communications between the participants 16, and the participants 16 can propagate information, e.g., one or more models for threat detection over the network 24. Additionally, selected ones or sets of participants 16, or all participants, may be members of verified, trusted threat intelligence groups or communities 26 (FIG. 1). Such intelligence communities exist and often leverage a common platform such as the Malware Information Sharing Platform (MISP). This system could leverage such a platform and community or be applied through ad hoc peering/sharing arrangements between (public and private) organizations that commonly exist. The program/product further may require specific authentication steps be taken prior to providing participants access thereto and further may require additional authentication or verification for participants to establish/verify that they are trusted members of select threat intelligence communities.

The security system 10 and/or product(s) 14 can enable the participants, which can include data owners, MSSPs, security analysts, security researchers, security application developers, security incident responders, and/or other entities members of a threat intelligence community to share analytical, e.g., statistical or probabilistic, models with enhanced security. The threat intelligence community members thus can leverage or utilize the network effect of different members running or applying such shared models on similar data, while enabling them to generate and provide secure updates to the derivation or function component(s) of the model to other members of the community without necessarily having to recreate or substantively change the model or the format thereof, as well as to upgrade or modify existing analytical models and identified encoded security attributes indicative of malicious or threat activities to enable potential prediction and detection of such malicious activity or attacks with enhanced efficiency and to substantially reduce response times for addressing such attacks or threats. The format of the analytical model can be easily shared, e.g., between members of the verified, trusted threat intelligence groups/communities 26, using an open language format or series of open formats so as to enable sharing of the model across a variety of software and hardware platforms. The program/product generally can allow the models and components thereof to be securely shared directly between members of the threat communities using common network communications methods, e.g., email, filing sharing services, etc., without the requirement of a third-party intermediary.

Figure 2:
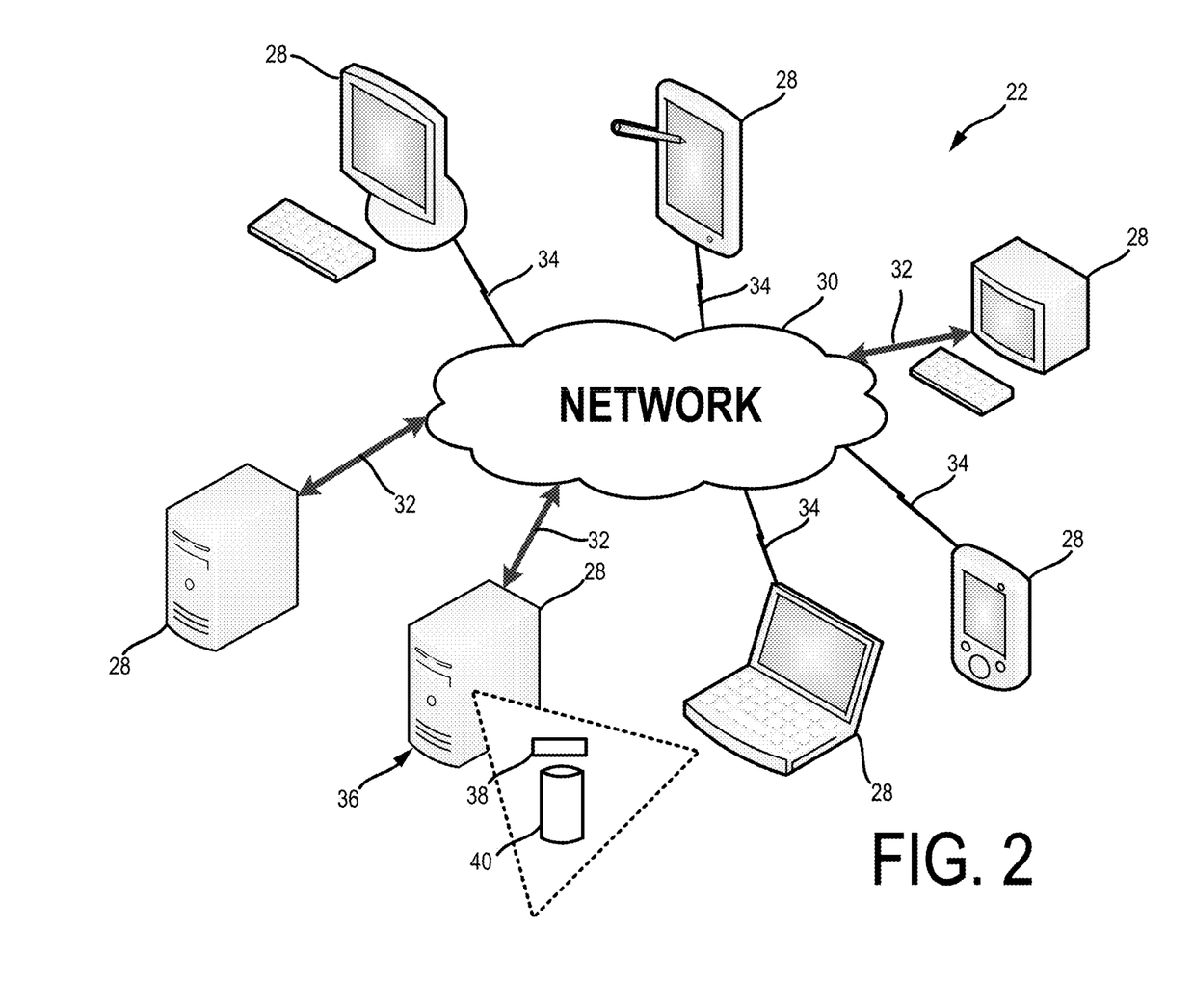
FIG. 2 is a block diagram of a network system of information handling systems according to principles of the present disclosure.

FIG. 2 is a block diagram of an exemplary networked system 22 of information handling systems/devices 28 or other communicable systems/devices of a series of participants or threat community members. A network 30 may provide data communications among the information handling systems/devices 28, which can include workstations, personal computers, smart cellular telephones, a personal digital assistants, laptop computers, servers, and other suitable devices. The network 30 can include a private or public network, such as a local area network, or other suitable network(s), such as the Internet or another wide area network, virtual personal network, peer to peer filing sharing system, and/or other suitable communication lines, or combinations thereof. The information handling systems 28 can be coupled to the network 30 through wireline connections 32, wireless connections 34, e.g., WiFi or cellular connections, or other suitable lines of communication. In some aspects, the information handling systems 28 of the networked system can be configured for a specific user or a specific use, such as financial transaction processing, airline reservations, enterprise data storage, gaming services, healthcare services, global communications, or any other suitable services or uses.

For purposes of this disclosure, an information handling system 28 may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling systems also may include one or more buses operable to transmit communications between the various hardware components. The information handling systems/devices may be structured or otherwise configured based on a Von Newman type architecture, though the information handling systems/devices further can be configured for quantum computing, e.g., can comprise a quantum processor with a plurality of superconducting qubits, or with another suitable architecture, without departing from the present disclosure.

As shown in FIG. 2, the linked or networked information handling systems further may include one or more monitoring devices 36 communicatively coupled to the network 30, for example, through a wired connection 32, though or other suitable connections, such as a wireless connection, also can be used. The monitoring device(s) 36 may include a server or sequence analyzer or other client suitable computing device that has a processor 38 and a memory 40 or other suitable storage. The memory 40 can include a random access memory (RAM), read only memory (ROM), and/or other non-transitory computer readable medium. The monitoring device(s) 36 further typically will be operable to store and execute computer readable instructions to continuously monitor, in real-time, activity at each networked system, for example, activity of the information handling systems 28 connected to network 30. Such monitored activity can include, by way of example, logging on and off of the networks by the information handling systems 28, downloads or uploads, changes to settings, etc. Additionally, network activities such as executed processes (i.e., type, number of times accessed, resulting actions, etc.), types and/or numbers of files modified, net flow aggregate, and other, similar activities, such as online purchases, access to websites, etc. also can be monitored and collected as part of security data/records.

The arrangement of each monitoring device(s) 36 and/or other devices illustrated in FIG. 2 is provided for explanation, and should not be considered as a limitation of the present disclosure. Data processing systems useful according to various embodiments of the present disclosure may omit a server, or may include additional servers, routers, note books, net books, tablets, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), BitTorrent®, Ethereum, P2P protocols, as well as others as will occur to those of skill in the art. Various embodiments of the present disclosure may be implemented on a variety of hardware platforms in addition to those illustrated in FIG. 2.

Figure 3:
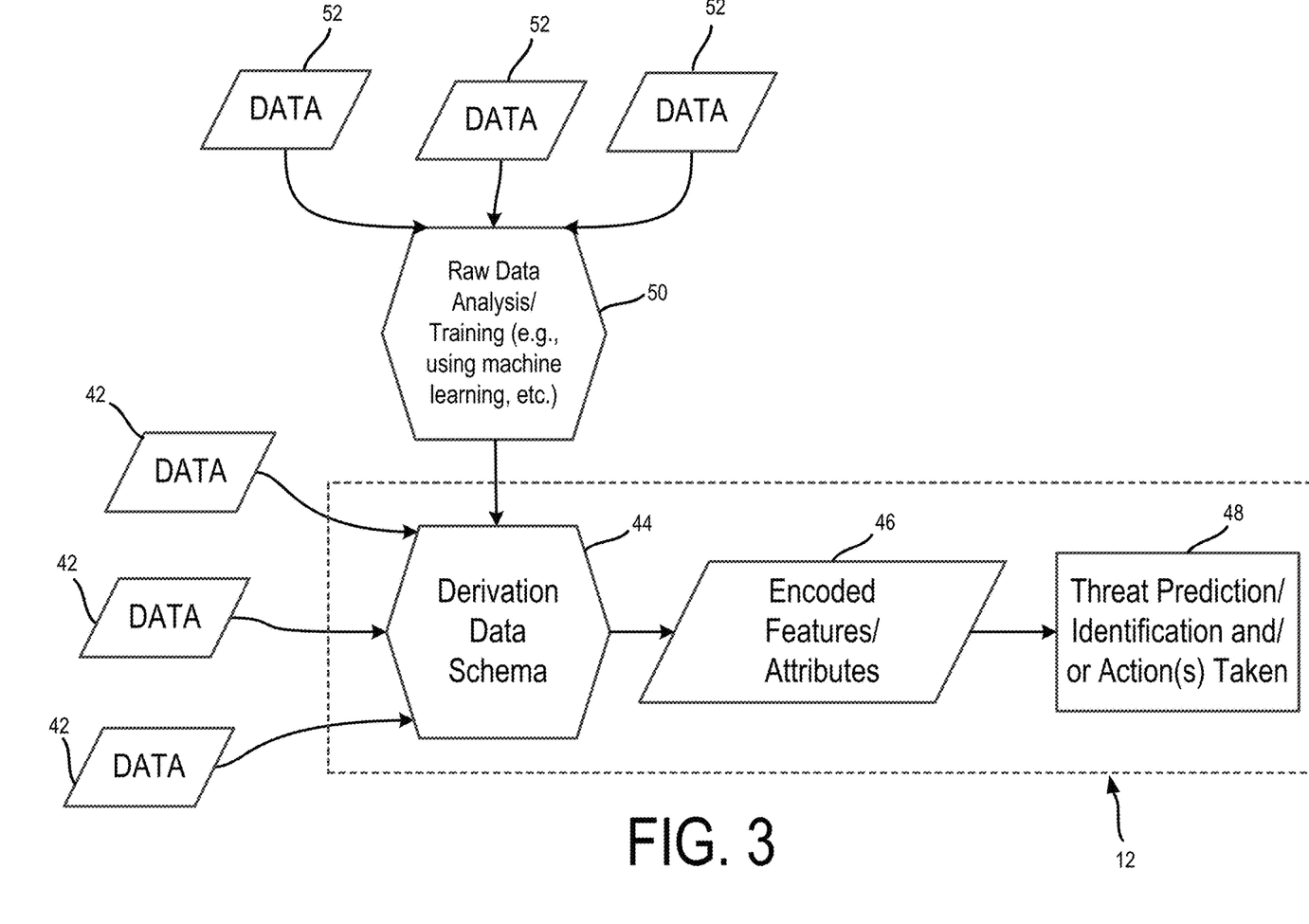
FIG. 3 is a schematic diagram of a threat prediction model according to one aspect of the present disclosure.

In addition, one or more of the participants can capture and analyze raw security data and/or can utilize devices such as a sequence analyzer 36 to analyze sequences of events occurring over the network 30 or at one of the information handling systems 28 connected thereto, and log, aggregate or otherwise collect security data based on the sequences of events or features thereof. As shown in FIG. 3, an analytic or threat prediction model 12 (or series of models) created according to the principles of the present disclosure can be created by one or more of the participants, and generally will include a fixed input component 42 (i.e., security data, e.g., including sequences of events, etc.) and a derivation data schema (DDS) component 44 that is applied to the raw security data 42 to predict/derive/determine the existence of data attributes 46 that may be known or are recognized, either alone or in combination with other derived/identified attributes or features, to indicate or predict the existence of a malicious or risk action or threat according to a desired or predetermined level of certainty/probability. The model further may have additional components 48 for predicting or identifying a threat based on the encoded features/attributes and/or for taking specified or predetermined remedial or mitigation actions based upon predicted or identified threats. The derivation data schema component 44 (and updates thereto) can derive or identify attributes/features or sequences of attributes/features to the raw security data, e.g., including specific events or features, such as events comprising executed processes (i.e., type, number of times accessed, resulting actions, etc.), types and/or numbers of files modified, netflow aggregate, and other, similar activities and/or features comprising URL's, hashes, IP addresses, hosts logged into, files accessed and/or deleted, logs sent or deleted, etc. For example, the derivative data schema can be developed with, updated using, or otherwise utilize machine learning, artificial intelligence, neural networks, name entity recognition, or other probabilistic or statistical modeling. In one embodiment, raw data analysis/training 50 can be used or applied to develop and encode/identify attributes/features thereof in raw data, e.g., training data 52 or other suitable accessed data, to develop or otherwise generate the derivative data schema component of the threat prediction/identification model.

In in one example embodiment, the model (or the components thereof) format or expression can be shared in an open format, enabling ease of sharing and use thereof across disparate device/hardware and/or software platforms. The derivation data schema component 44 of the model will, however, be encrypted for transmission to various or selected participants or verified/trusted members of threat intelligence communities (e.g., 26 in FIG. 1). As a result, regardless of a threat actor gaining access to or knowledge of the model itself and/or the raw security data, the derivation data schema to be used by the model (and updates thereto) to derive selected encoded attributes of such data that are used by the threat intelligence community participants/members to predict/derive a malicious act or threat and/or remediate such acts, can be kept/transmitted securely. The participants further can use the derivative data schema in conjunction with other selected models for security threat detection/identification. This will enable secure sharing of the models (or the DDS components) directly between members of the threat communities, e.g., using email or other suitable network communications. This further can enable easy and secure sharing of the predictive models across or to a wide variety of participants for leveraging the network effect between a series of data developers/owners using or otherwise accessing the platform so as to enable such data owners/developers to benefit from the actions taken/analysis of similar or shared data by a number of shared data owners analyzing and/or applying security modules/applications to this data in parallel, and/or new or updated security applications or models developed thereby.

Figure 4:
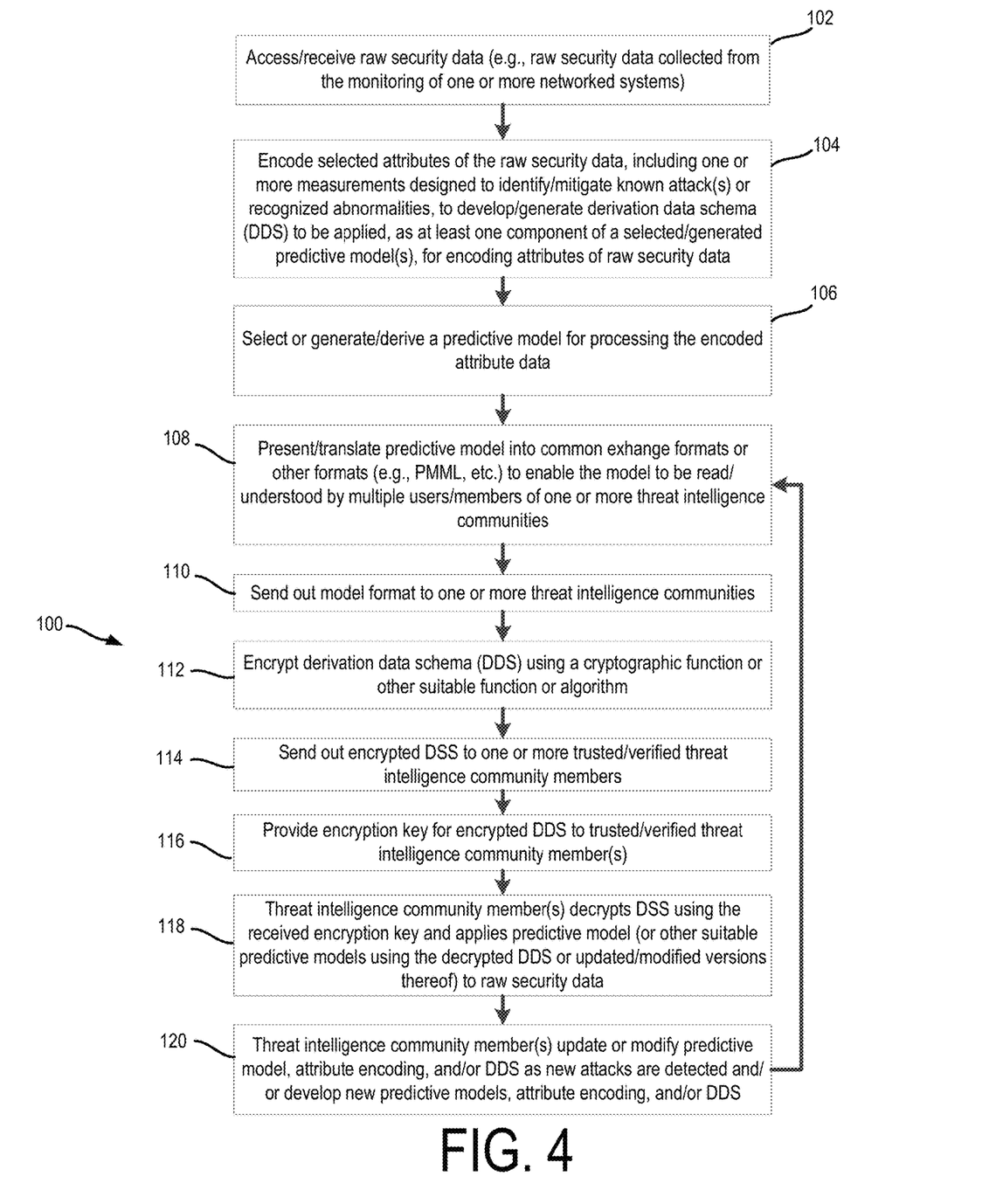
FIG. 4 is a flow diagram illustrating a process or method for secure propagation or sharing of statistical models according to an aspect of the present disclosure.

FIG. 4 shows an exemplary method or process 100 for operation of the program(s)/product(s) 14 for secure propagation and/or sharing of statistical models according to embodiments of the present disclosure. The program(s)/product(s) 14 according to embodiments of the present disclosure can be accessed by or run on one or more of the information handling systems 28 including a plurality or set of work flow(s) or instructions, etc., programmed and carried out by a processor (702) or other suitable component of the information handling systems of one or more of the participants in a community or shared network/group, though the program(s)/product(s) makes operated on or be access by any other information handling systems/devices or other suitable systems that may be necessary for implementation thereof, without departing from the present disclosure.

As shown in FIG. 4, at Step 102, the processor (or series of processors) may access or receive raw security data, for example, security data aggregated, ingested, or otherwise collected using a sequence analyzer(s) 36 or similar application or device monitoring a network or system linked to or in communication with the processor. In addition, or alternatively, the processor(s) may access security data developed or exchanged between participants or members in one or more threat communities 26, MSSPs and their clients, security analysts, security researchers, security application developers, security incident responders, like actors or partners, and/or other suitable entities.

At Step 104, the processor(s) further may encode selected attributes of the security data, including one or more measurements that are designed to identify or mitigate known attacks or recognized or identified abnormalities to generate/develop a derivation data schema (DDS) that can be applied as a component in a selected predictive model for detecting/identifying security threats or malicious/suspicious actors. In one example embodiment, the derivation data schema may be developed/generated using, or otherwise utilizing, machine learning or other probabilistic or statistical analysis, and can encode selected attributes or features of raw security data or sequences thereof to develop encoded attribute data.

A predictive model then can be selected, generated or derived for processing of the encoded attribute data (Step 106). The selected/generated predictive model thereafter can be presented or translated into open or common exchange formats or other formats (e.g., PMML, etc.), to enable the predictive model to be read or otherwise understood by multiple users, participants or members of one or more threat intelligence communities (Step 108).

FIG. 4 further shows that the predictive model can be sent out to or otherwise received by one or more members of the threat intelligence communities (Step 110). In addition, at Step 112, the derivation data schema to be applied by the model can be encrypted before such function is transmitted or shared, e.g., by applying a cryptographic function or algorithm, such as an asymmetric cryptographic function that, once decrypted will allow the schema to derive new feature values over a window of raw vectors for other members of the community, though other suitable cryptographic functions/algorithms can be used without departing from the present disclosure. The encrypted derivation data schema (DDS) thereafter will be sent out to or otherwise received by one or more trusted or verified members of threat intelligence communities (Step 114). An encryption key or other suitable feature to decrypt the encrypted derivation data schema also can be provided to the trusted or verified threat intelligence community member(s) (Step 116). The model, the encrypted derivative data schema, and/or the encryption key can be shared directly between participants or members of the trusted/verified threat intelligence communities, e.g., using existing platforms, such as a Malware Information Sharing Platform (MISP), or through traditional electronic communication methods, such as email, etc.

At Step 118, the threat intelligence community participants or member(s) can use the received encryption key to decrypt the received encrypted derivation data schema and thereafter apply the received predictive model or other suitable predictive model using the decrypted derivation data schema or updated/modified versions thereof to raw security data. For example, the model will be applied to raw security data aggregated or collected by individual participants or members of the threat intelligence community, such as from monitoring or observing one or more networked systems controlled or otherwise accessed thereby.

In one embodiment, the member(s) of the threat intelligence community may modify and/or otherwise update the received and decrypted and/or the underlying model to include specific thresholds or tolerances that satisfy the particular member's specific demands/circumstances. For example, the derivation data schema may be developed/generated by a member/participant that does not frequently use a specific tool, e.g., PSexec or other suitable tool for running remote commands, and thus the developed/generated derivation data schema may encode the use, or an aggregate use or particular sequence of use, of the specific tool as an attribute or feature indicative of a security threat or malicious action. As a result, if another member/participant who commonly utilizes the specific tool, e.g., a PSexec or other suitable tool for running remote commands, receives the derivation data schema, such member/participant might adjust the thresholds for encoding use of the specific tool as indicative of a security threat/malicious actions (or may apply a different model) to reduce false positives by an applied predictive model.

Returning to FIG. 4, at Step 120, the threat intelligence community member(s) can update the attribute encoding and/or derivation data schema as new attacks are detected, and also can develop their own derivation data schemas or predictive models for distribution/sharing with other members of the threat intelligence community. Steps 108 to 120 can be repeated, as necessary, to share the updated or new derivation data schema and/or models with other selected members of the threat communities.

Figure 5:
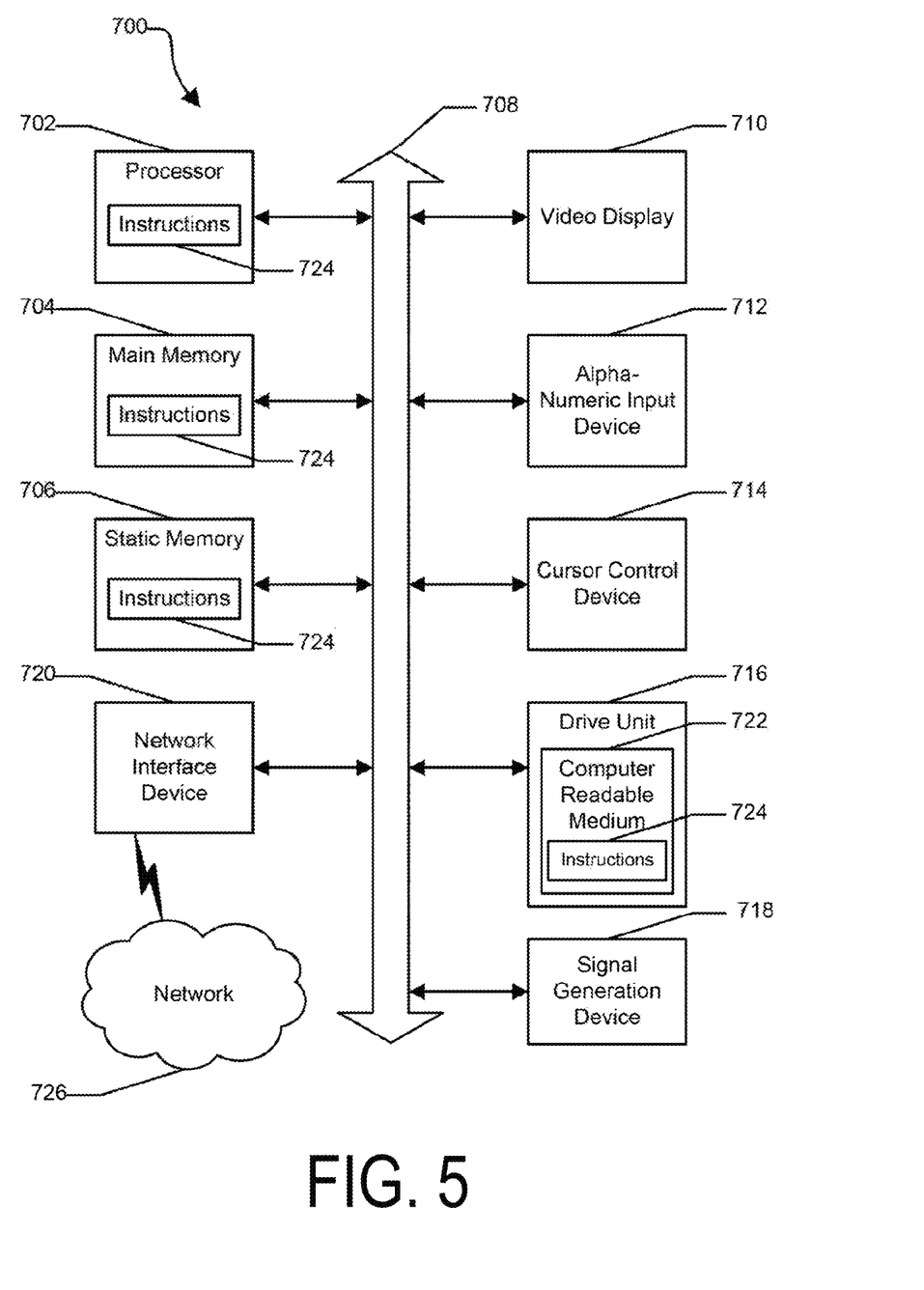
FIG. 5 is a block diagram illustrating an information handling system according to one example embodiment of the present disclosure.

FIG. 5 shows an example of an information handling system 700 capable of administering each of the specific embodiments of the present disclosure. The information handling system 700 can represent the user information handling systems 28 of FIG. 2. The information handling system 700 may include a computer system or processor 702 such as a central processing unit (CPU), a graphics processing unit (GPU), or both. Moreover, the information handling system 700 can include a main memory 704 and a static memory 707 that can communicate with each other via a bus 708. The information handling system 700 includes near-field communications (NFC) device and interface 718, such as an antenna and NFC subsystem. The information handling system 700 can also include a disk drive unit 716, and a network interface device 720. As shown, the information handling system 700 further may include a video display unit 710, such as a liquid crystal display (LCD), an organic light emitting diode (OLED), a flat panel display, a solid state display, or a cathode ray tube (CRT), or other suitable display. The video display unit 710 may also act as an input accepting touchscreen inputs. Additionally, the information handling system 700 may include an input device 712, such as a keyboard, or a cursor control device, such as a mouse or touch pad, or a selectable interface on the display unit. Information handling system may include a battery system 714. The information handling system 700 can represent a device capable of telecommunications and whose can be share resources, voice communications, and data communications among multiple devices. The information handling system 700 can also represent a server device whose resources can be shared by multiple client devices, or it can represent an individual client device, such as a laptop or tablet personal computer.

The information handling system 700 can include a set of instructions that can be executed to cause the processor to perform any one or more of the methods or computer based functions disclosed herein. The processor 702 may operate as a standalone device or may be connected such as using a network, to other computer systems or peripheral devices.

In a networked deployment, the information handling system 700 may operate in the capacity of a server or as a client user computer in a server-client user network environment, or as a peer computer system in a peer-to-peer (or distributed) network environment. The information handling system 700 can also be implemented as or incorporated into various devices, such as a personal computer (PC), a tablet PC, a set-top box (STB), a smartphone, a PDA, a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 700 can be implemented using electronic devices that provide voice, video or data communication. Further, while a single information handling system 700 is illustrated, the term "system" shall also be taken to include any collection of systems or subsystems that individually or jointly execute a set, or multiple sets, of instructions to perform one or more computer functions.

The disk drive unit 716 or static memory 714 may include a computer-readable medium 722 in which one or more sets of instructions 724 such as software can be embedded. The disk drive unit 716 or static memory 714 also contains space for data storage. Further, the instructions 724 may embody one or more of the methods or logic as described herein. In a particular embodiment, the instructions 724 may reside completely, or at least partially, within the main memory 704, the static memory 706, and/or within the processor 702 during execution by the information handling system 700. The main memory 704 and the processor 702 also may include computer-readable media. The network interface device 720 can provide connectivity to a network 726, e.g., a wide area network (WAN), a local area network (LAN), wireless network (IEEE 702), or other network. The network interface 720 may also interface with macrocellular networks including wireless telecommunications networks such as those characterized as 2G, 3G, 4G, 5G, LTE or similar wireless telecommunications networks similar to those described above. The network interface 720 may be a wireless adapter having antenna systems 732 for various wireless connectivity and radio frequency subsystems 730 for signal reception, transmission, or related processing.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit.

Accordingly, the present system encompasses software, firmware, and hardware implementations. In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 724 or receives and executes instructions 724 responsive to a propagated signal; so that a device connected to a network 728 can communicate voice, video or data over the network 728. Further, the instructions 724 may be transmitted or received over the network 728 via the network interface device 720. In a particular embodiment, BIOS/FW code 724 reside in memory 704, and include machine-executable code that is executed by processor 702 to perform various functions of information handling system 700.

Information handling system 700 includes one or more application programs 724, and Basic Input/Output System and Firmware (BIOS/FW) code 724. BIOS/FW code 724 functions to initialize information handling system 700 on power up, to launch an operating system, and to manage input and output interactions between the operating system and the other elements of information handling system 700.

In another embodiment (not illustrated), application programs and BIOS/FW code reside in another storage medium of information handling system 700. For example, application programs and BIOS/FW code can reside in drive 716, in a ROM (not illustrated) associated with information handling system 700, in an option-ROM (not illustrated) associated with various devices of information handling system 700, in storage system 707, in a storage system (not illustrated) associated with network channel 720, in another storage medium of the information handling system 700, or a combination thereof. Application programs 724 and BIOS/FW code 724 can each be implemented as single programs, or as separate programs carrying out the various features as described herein.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile, read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality.

The information handling system can include memory (volatile (such as random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method of securely propagating analytical models for detection of security threats and/or malicious actions among members of a threat intelligence community, comprising:
   determining and encoding attributes of security data common to, accessible by, and/or shared between the members of the threat intelligence community, the attributes including one or more measurements or features selected as indicating, identifying, predicting and/or mitigating potential malicious actions or security threats;
   developing or selecting an analytical model for detection of the potential malicious actions or security threats using the encoded attributes of the security data and a derivation data schema;
   encrypting the derivation data schema of the model;
   translating the model into one or more common exchange formats for sharing the model with at least selected ones of the members of the threat intelligence community;
   transmitting the encrypted derivation data schema of the model to the at least selected ones of the members of the threat intelligence community;
   after receipt, decoding the derivation data schema at the selected ones of the members of the threat intelligence community and applying the derivation data schema to security data to determine if the encoded attributes are found;
   if the encoded attributes are found, applying a remedial or mitigating action.

2. The method of claim 1, further comprising:
   updating the derivation data schema as new attacks or threats are detected by the selected ones of the members of the threat intelligence community to provide an updated derivation data schema,
   encrypting the updated derivation data schema, and
   sharing the encrypted updated derivation data schema with other members of the threat intelligence community.

3. The method of claim 1, wherein developing or selecting the analytical model comprises deriving a predictive model in a common exchange format.

4. The method of claim 1, wherein encrypting the derivation data schema comprises applying an asymmetric cryptographic function to encrypt the derivation data schema.

5. The method of claim 1, wherein determining and encoding attributes comprises identifying features of the security data indicative of known security threats.

6. The method of claim 5, wherein the features comprise: URL's, hashes, IP addresses, hosts logged into, processed executed, windows registry keys added, files accessed and/or logs sent or deleted.

7. The method of claim 1, further comprising updating the encoded attributes and/or the derivation data schema based at least in part on the found encoded attributes.

8. A system for securely propagating analytical models for detection of security threats and/or malicious actions among members of a threat intelligence community, comprising:
   at least one processor; and
   a non-transitory computer readable storage medium having instructions stored therein, the instructions, when executed by the at least one processor, cause the system to:
   determine and encode attributes of security data common to, accessible by, and/or shared between the members of the threat intelligence community, the attributes including one or more measurements or features selected as indicating, identifying, predicting and/or mitigating potential malicious actions or security threats;
   develop an analytical model for detection of the potential malicious actions or security threats using the encoded attributes of the security data and a derivation data schema;
   encrypt the derivation data schema of the model;
   translate the model into one or more common exchange formats for sharing the model with at least selected ones of the members of the threat intelligence community; and
   transmit the encrypted derivation data schema of the model to the at least selected ones of the members of the threat intelligence community;
   wherein after receipt of the model and encrypted derivation data schema, the selected ones of the members of the threat intelligence community decode the derivation data schema and apply the derivation data schema to security data according to the model to determine if the encoded attributes are found, and if the encoded attributes are derived, apply a remedial or mitigating action.

9. The system of claim 8, wherein the selected ones of the members of the threat intelligence community update the derivation data schema as new attacks or threats are detected to provide an updated derivation data schema, encrypt the updated derivation data schema, and share the encrypted updated derivation data schema with other members of the threat intelligence community.

10. The system of claim 8, wherein developing the analytical model comprises deriving a predictive model in a common exchange format.

11. The system of claim 8, wherein encrypting the derivation data schema comprises applying an asymmetric cryptographic function to encrypt the derivation data schema.

12. The system of claim 8, wherein determining and encoding attributes comprises identifying features of the security data indicative of known security threats.

13. The system of claim 12, wherein the features comprise: URL's, hashes, IP addresses, hosts logged into, files accessed and/or logs sent or deleted.

14. The system of claim 8, wherein the encoded attributes and/or the derivation data schema are updated based at least in part on the encoded attributes format.

* * * * *